United States Patent [19]
Loschke et al.

[11] Patent Number: 5,956,336
[45] Date of Patent: Sep. 21, 1999

[54] APPARATUS AND METHOD FOR CONCURRENT SEARCH CONTENT ADDRESSABLE MEMORY CIRCUIT

[75] Inventors: Jon Ashor Loschke; Charley Michael Parks; Mark Franklin; Kenneth Wade Jones, all of Austin, Tex.

[73] Assignee: Motorola, Inc., Schaumburg, Ill.

[21] Appl. No.: 08/722,587

[22] Filed: Sep. 27, 1996

[51] Int. Cl.[6] .................................................. H04L 12/28
[52] U.S. Cl. .......................... 370/392; 370/395; 370/429
[58] Field of Search ..................................... 370/399, 382, 370/383, 392, 393, 395, 397, 409, 416, 429; 365/49, 190, 189.12, 230.02; 395/200, 200.2, 200.21

[56] References Cited

U.S. PATENT DOCUMENTS

| | | | |
|---|---|---|---|
| 5,414,707 | 5/1995 | Johnston et al. | 370/79 |
| 5,422,838 | 6/1995 | Lin | 365/49 |
| 5,467,349 | 11/1995 | Huey et al. | 370/60.1 |
| 5,684,954 | 11/1997 | Kaiserswerth et al. | 395/200.2 |

*Primary Examiner*—Ajit Patel
*Assistant Examiner*—Chiho Andrew Lee
*Attorney, Agent, or Firm*—Lee E. Chastain

[57] ABSTRACT

A circuit and method is provided for implementing a content addressable memory circuit (100) in which an output word is produced which corresponds to the content of a reference word containing an ATM header. According to a first aspect, a binary search logic circuit (104) binarily searches the memory array (101) to find a match word whose content is equal to that of the reference word. Output signals indicate either that a match has been found or that the binary searching of the memory array (101) should continue at addresses either above or below the location address of the match word. According to a second aspect, the content addressable memory circuit (100) performs a concurrent search of switching identifiers, virtual circuit identifiers and virtual path identifiers, to determine if a virtual path connection or virtual circuit connection exists for an ATM header.

12 Claims, 8 Drawing Sheets

APPARATUS AND METHOD FOR CONCURRENT SEARCH CONTENT ADDRESSABLE MEMORY CIRCUIT

FIELD OF THE INVENTION

The present invention generally relates to digital electronic devices, and more specifically to devices used to manage header information in a switching network.

BACKGROUND OF THE INVENTION

Communication and computer networks consist of a variety of hardware equipment and software and are increasing in use and complexity. The popularity of computer networks as a computer paradigm and the growth in amount of data transferred between network users has forced the capacity of networks and protocols to increase with time. A variety of network communication protocols transfer data between devices coupled by a network. Ethernet and Asynchronous Transfer Mode are examples of such communication protocols.

Asynchronous Transfer Mode ("ATM", hereafter) provides bandwidths as low as 25 megabits/second using twisted cables and as high as 10 gigabits/second using optical cables. An ATM switch transfers cells between various points in a network. A cell contains control information, a header, and a data packet. The header within the cell contains switching identifiers enabling the ATM switch to route the data. The ATM switch interrogates each switching identifier it receives against a programmed list to determine which output channel the cell should be output. When the data packets are received by the intermediate node, destination information is contained in header which accompanies the data packet. The node determines whether it has previously agreed to route the data packets for that transmission by examining its memory to determine whether the destination information has previously been stored. If it has, a forwarding address has also been stored and the node forwards the data packet to the next node in the route toward the destination address. As it receives each data transmission, the node interrogates the contents of its memory to determine if it has agreed to forward the transmission. If the destination information is present, the memory produces a forwarding address associated with the destination information for routing the data packet to the next node.

Content addressable memories ("CAM", hereafter) store the switching identifiers for the ATM switch. In an associative or content addressable memory, match words and switching identifiers are stored in associated pairs in memory. When the CAM receives a reference word it determines whether a match word equal to the reference word is stored in memory. If so, it produces the link word associated with the matched reference word. An important aspect of a CAM is the association between the match word and its associated link word, much like a dictionary, where each word is stored in association with its definition. In a dictionary, a provided word is looked up and the definition associated with the word is produced. In a CAM, a provided reference word is looked up, i.e., compared with a match word and, if they are equal, a link word associated with the match word is produced.

In general, the memory array of an ATM CAM is organized into a match word table and a link word table. If a reference word matches an entry from a match word table the associated link word is produced at the output. If no match is found, the output word indicates the failure by, for example, setting an error flag bit. In an ATM application, the reference word consists of switching identifiers. The switching identifiers consist of a virtual path identifier ("VPI", hereafter) and a virtual channel identifier ("VCI", hereafter). The CAM compares the VPI and VCI in the header with the VPI and VCI entries in the CAM. The switching identifiers determine if a virtual path connection ("VPC", hereafter) exists or a virtual circuit connection ("VCC", hereafter) exists.

Smaller sized CAMs often provide this function in hardware such that the reference word is simultaneously compared with every word in the match word table, thereby operating in a full parallel mode in which the output word is produced in one clock cycle. However, as the need for larger CAMs grows, the parallel mode is not possible due to longer search times.

A previously known technique for implementing a large CAM is to presort the memory into distinct classes. For example, a 4,096 word deep CAM is preclassified into four separate, shallower 1,024 word CAMs wherein particular match and link word pairs could only be stored in one of the CAMs. However, this approach has a disadvantage in that the CAM corresponding to one of the classes could be filled while others had substantial vacancies, thereby effectively reducing the depth of the CAM. Adding logic to the CAM for dynamically adjusting the size of each CAM as needed would substantially increase the complexity and cost of the CAM.

Furthermore, in order to establish a VCC or VPC, two searches to each CAM entry are required, whether a parallel or serial search strategy is used. The first search checks for a VCC, comparing the input header and the switching identifiers. The second search is for the VPC, comparing the input header and the switching identifiers.

Two known approaches are used to perform parallel searches. One method uses one CAM array, interrogating each entry twice. Another method uses two separate CAMs, with each CAM only storing either VCI or VPI. The one CAM approach will take more time than the dual CAM approach. However, the dual CAM approach adds more hardware and cost to a switch network.

DETAILED DESCRIPTION OF THE DRAWINGS

Figure 1:
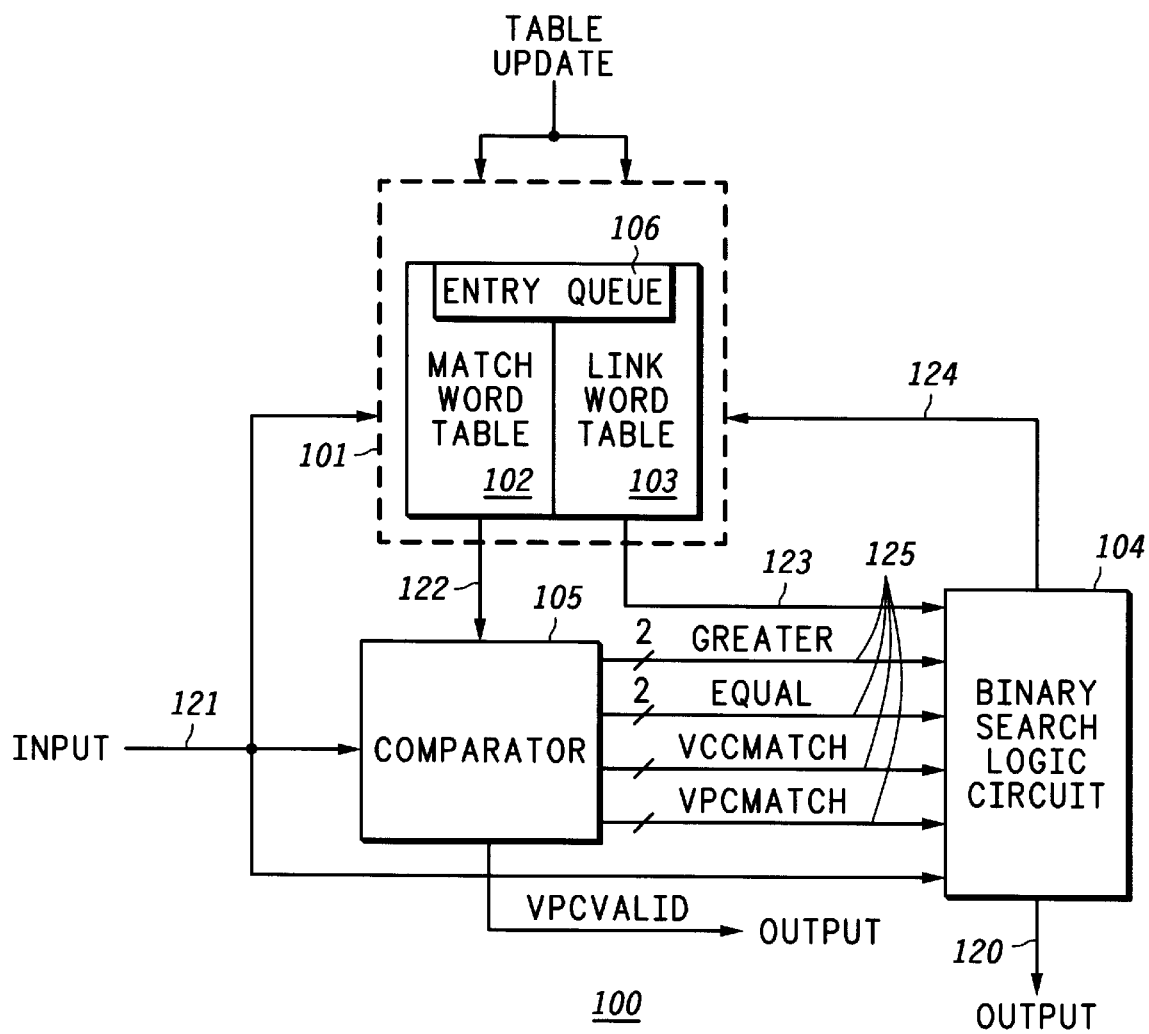
FIG. 1 depicts a block diagram of a content addressable memory circuit implemented in accordance to the present invention.

FIG. 1 is a block diagram of a content addressable memory (CAM) circuit 100 as used in a network data routing circuit in accordance with the present invention. CAM 100 stores data in and accesses data for comparison according to a novel method. This scheme reduces access time without artificially excluding header information from portions of CAM 100. CAM 100 is thereby both fast and efficient in its use of memory. Furthermore, each individual comparison for a VCC or a VPC match is accelerated according to a second aspect of the disclosed invention.

Continuing with FIG. 1, the CAM 100 comprises an array of memory words 101, a comparator circuit 105, a binary search logic circuit 104, and an entry queue 106. CAM 100 has an output at terminal 120 for providing an output word based on the content of a reference word. As used herein, the term "terminal" refers to a single electrical conduction line and also includes bus lines comprising multiple electrical conduction lines. The CAM 100 has an input at terminal 121 for receiving a destination header signal or other transmitted data from the network. The reference word is transmitted as part of the destination header signal.

The array of memory words 101 comprises a core of static RAM cells and is configured as a match word table 102 and a link word table 103 such that at each location address the stored memory word is made up of a match word and an associated link word. In one embodiment each static RAM cell is comprised of four transistors and has an access time of five nanoseconds. Depending on the application, the array of memory words 101 can alternatively be comprised of dynamic RAMs or flash memory. An input at terminal 124 receives the location address signal which selects a memory word from the array, and first and second outputs at terminals 122 and 123 respectively provide the selected match word and link word.

The comparator circuit 105 has first and second inputs at terminals 121 and 122 for respectively receiving the reference word and the selected match word, and an output at terminal 125 for providing five output signals, a GREATER signal, an EQUAL signal, a VCCMATCH signal, a VPCMATCH signal, and a VPCVALID signal. Comparator circuit 105 compares the contents of the reference word and the selected match word and asserts the output signal corresponding to the logical result of the comparison. For instance, if the input reference word is greater than the selected match word, then comparator 105 asserts the GREATER signal. The VCCMATCH and VPCMATCH are asserted for a VCC and VPC match, respectively. If a VPC match exists, then comparator 105 asserts the VPCVALID signal. Comparator 105 and the GREATER signal, the EQUAL signal, the VCCMATCH signal, the VPCMATCH signal, and the VPCVALID signal are discussed below in connection with FIG. 8 and FIG. 10.

The entry queue 106 receives reference words for table updates. Reference words to be added to or deleted from CAM 100 are buffered. In some embodiments, the buffered entries in entry queue 106 may be searched linearly prior to searching the match word table. The method of searching the match word table is described immediately below. In yet another embodiment, the entry queue 106 is removed and the reference words are sorted as soon as the CAM 100 is available.

The binary search logic circuit 104 performs a binary search of the match word table 102 to determine whether an entry in the match word table 102 has the same content as the reference word. A binary search requires that the table to be searched be sorted into a predetermined order. Therefore, at system startup, and prior to accepting a reference word, the array of memory words 101 is sorted into a predetermined order based on the entries in match word table 102. In the depicted embodiment, the reference word-link word pair having the smallest reference word is stored in the first entry of array of memory words 101, the reference word having the second smallest reference word is stored in the second entry of the array of memory words, etc.

In theory, the match word table can be sorted into any predetermined order. However, the order must be discernible by the comparator circuit 105 such that when it compares a given reference word with a selected match word it can determine whether a matching match word, if it is to be found in the match word table 102, has a higher or lower address than the selected match word.

Figure 2:
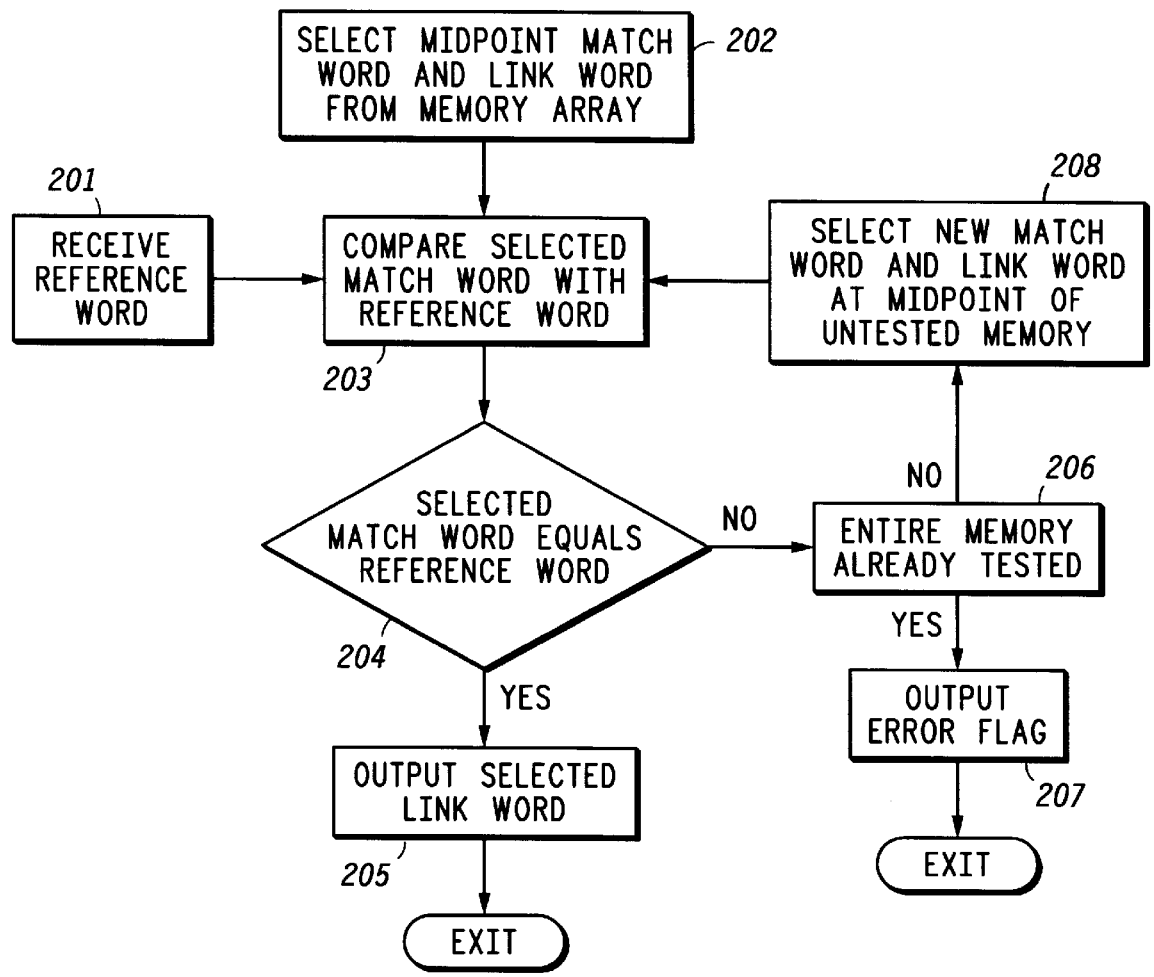
FIG. 2 depicts a flow diagram of a method for implementing a content addressable memory circuit in accordance with the present invention.

FIG. 2 is a flow diagram of the CAM implementation of the binary search algorithm used by the binary search logic circuit 104 to binarily search the array of memory words 101 to determine if a match word is stored which matches the reference word. It is assumed that the match table has previously been sorted from, for example, low to high in order of increasing location addresses. At step 201 the reference word is received from, for example, a network bus. At step 202, a location address corresponding to the midpoint of the memory array is provided for selecting a match word and an associated link word from the array. Step 203 compares the selected match word to the reference word. If they are equal, (step 204), then the selected link word is provided at the output of the CAM at step 205 and the binary search ends.

If the selected match word is not equal to the reference word, (step 204), then the binary search logic circuit determines at step 206 whether the entire array has already been compared with the reference word. If the entire array of memory words 101 has not already been tested, then a new location address is provided which corresponds to the midpoint of the half of the memory array in which a match word which matches the reference word can possibly be found. It is a characteristic of this binary search method that after each comparison according to steps 203 and 204 one-half of the memory is eliminated from possibly containing a matching match word because of the previous sorting of the memory array into a predetermined order. Therefore, each cycle of the binary search progressively reduces by one-half the untested portion of the memory array.

If step 206 determines that the entire memory array has been tested with no matching match word found, then an error flag is set at the output at step 207 and the binary search terminates. If a portion of the memory array remains to be tested (step 206), however, a new location address is provided at step 208 which corresponds to the midpoint of the untested portion of the memory array. The new location address selects new match and link words at step 202 and the cycle repeats until the binary search terminates.

Returning to FIG. 1, the binary search logic circuit 104 has a first output at terminal 124 for providing a location address signal to the array of memory words. At any cycle of the binary search, the location address is chosen to be at essentially the midpoint of the untested portion of the array of memory words 101. If there are an even number of entries in the match word table, as is generally the case, there is no exact midpoint location address, so that the next higher or lower location address is chosen, i.e., the lowest address in the upper half of the array.

When this location address signal is received by the array of memory words 101 a selected match word and a selected link word are respectively produced at the first and second outputs at terminals 122 and 123. The selected match word is compared with the reference word in comparator circuit 105, which produces an output signal corresponding to the result of the comparison. The output signal indicates one of six results of the comparison: first, the reference word and match word are equal; second, continue searching at higher location addresses; and third, continue searching at lower location addresses; and fourth, end searching if a VPC occurs; and fifth, end searching if a VCC occurs; and sixth, the comparator 105 asserts the VPCVALID signal which propagates to a output logic pin.

The binary search logic circuit 104 has a first input at terminal 125 which receives the output signal from the comparator circuit 105. A second input at terminal 123 receives from the link word table 103 the selected link word which is associated with the selected match word. If the contents of the reference and selected match words are equal, the binary search logic circuit 104 produces the selected link word at its output at terminal 120, which is coupled to the output of the CAM 100. The output of the CAM 100 therefore includes the selected link word, possibly adding a flag bit to indicate that the match was successful. Other information can be provided at the output of the CAM 100 including but not limited to number of searches, the amount of time of the search, and successful hit percentage within the CAM.

If the reference and selected match words do not match, then the output signal from the comparator circuit 105 indicates whether a matching match word, if it is stored in the match word table 102, is located above or below the midpoint location address. If, for example, the comparator circuit 105 indicates that the search should continue in the half of the match word table 102 above the previous midpoint location address, then the binary search logic circuit 104 provides a new location address at the midpoint of the region of the match word table immediately above the region just tested. A new match word corresponding to the new midpoint location address is compared to the reference word and the cycle repeats itself.

In a binary search, each comparison of the reference word to a new match word either produces a match or eliminates one-half of the match word table 102 as a possible location address where a match can be found. Successive cycles effectively treat the remaining portion of the match word table 102 as if it were a new table, sending a new location address corresponding to the midpoint of the remaining portion of the array of memory words 101.

The time needed for completing each cycle of the binary search is generally determined by the speed of the static RAM core which comprises the array of memory words 101. In an embodiment in which the array of memory words 101 is 4,096 memory entries deep, the time needed for completing each cycle is ten nanoseconds. Twelve successive bisections are needed for reducing the 4,096 memory words to one memory word, the array of memory words 101 can be binarily searched in at most twelve cycles. A complete search is therefore completed in 120 nanoseconds. For an array of memory words 101 with a capacity of 16,384 memory words, two additional binary search cycles must be provided for, so the search is completed in 140 nanoseconds.

It is possible for the binary search to be completed with no match word found that matches the reference word. In that case, no link word is provided at the output of the CAM 100, and an error flag bit indicating that no match was found or that the search is completed is generally provided.

In some applications it is necessary to update the match word table 102 and link word table 103 to include new entries or to delete entries which are no longer useful. For that reason, the binary search logic circuit 104 has a third input connected to terminal 121 for receiving the new entries. If the array of memory words 101 is full and no existing entries can be deleted, the new entry is not processed any further, and an error bit is set in the output word to indicate that the new entry is not accepted.

If the array of memory words 101 has a vacant location a new entry is accepted and inserted. Recall that the new entry must be inserted so as to preserve the predetermined order of the array of memory words 101. In one embodiment, the binary search logic circuit 104 begins at the vacant location, say the top of the array of memory words 101, and examines the stored memory word in light of the new entry and the need to maintain the predetermined order of the array of memory words 101. The new entry is inserted in the vacant location if doing so maintains the predetermined order. The binary search logic circuit 104 determines the proper location of the new entry.

If the CAM 100 is otherwise idle during the insertion process, an array of memory words 101 which is 4,096 words deep requires an average of about twenty microseconds, with a worst case of about forty microseconds, to insert the new entry at the correct location.

Figure 3:
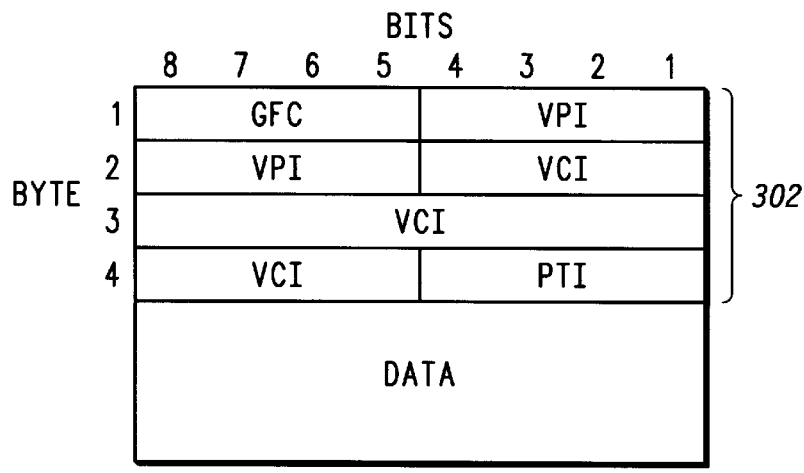
FIG. 3 depicts an asynchronous transfer mode (ATM) cell header in accordance with the present invention.

FIG. 3 depicts an asynchronous transfer model (ATM) cell 300 in accordance with the present invention. The ATM cell contains a header 302 which itself contains routing information for switching networks. The header 302 information is input to comparator 105 in FIG. 1 via terminal 121. The switching identifiers route the data packet based on VCI and VPI contained in the header 302. Byte 1 contains 4 bits for a generic flow control("GFC", hereafter) and contains 4 bits for the VPI in a user network interface ("UNI", hereafter) protocol. However, in a network network interface ("NNI", hereafter) protocol, Byte 1 contains 8 bits for the VPI. Byte 2 contains 4 bits for the VPI and contains 4 bits for the VCI. Byte 3 contains 8 bits for the VCI. Byte 4 contains 4 bits for the VCI and 4 bits for the payload type identifier("PTI", hereafter), for both UNI and NNI protocols. The remaining bytes contain the data packet. The data packet("data", hereafter) could consist of computer code, telephone communication, or any information to be routed.

Figure 4:
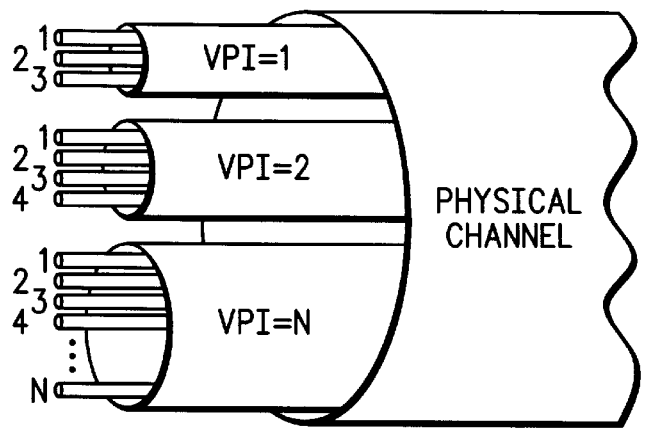
FIG. 4 depicts a physical channel containing virtual circuit identifiers and virtual path identifiers in accordance with the present invention.

FIG. 4 depicts a physical channel 400 containing VCI and VPI in accordance with the present invention. The physical channel 400 represents a physical data transmission structure such as optical cables, twisted cables, and phone cables. The physical channel 400 contains VPCs and VCCs, wherein the VPCs and VCCs contain individual VPI and VCI. A VPC can be conceptualized as a trunk of multiple circuits, all with the same VPI and all being switched in the same manner. A VCC is one specific VCI within a VPI routing to a different VCI within a different VPI. Routing for VCC and VPC is discussed below in FIG. 5. In this embodiment, up to 4,096 VPI are possible and up to 65,536 VCI per VPI are possible.

Figure 5:
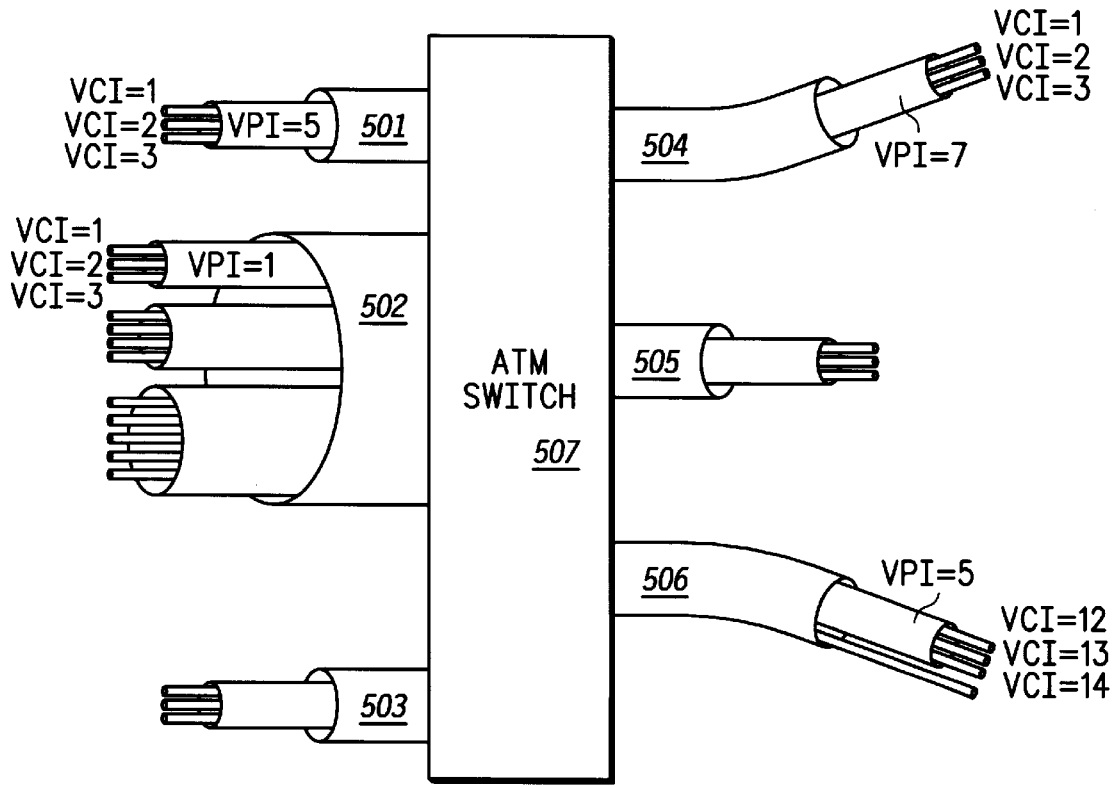
FIG. 5 depicts an ATM switch containing virtual circuit connections and virtual path connections in accordance with the present invention.

FIG. 5 depicts an ATM switch 507 containing VCC and VPC in accordance with the present invention. The ATM switch 507 receives multiple input paths and generates multiple output paths with a variety of data. The ATM switch 507 handles data within the input and output paths and routing of paths occurs instantaneously (on the fly). The ATM switch 507 illustrates a switching network with a plurality of physical channels 400. In one example, the ATM switch 507 receives a physical channel 501, a physical channel 502, and a physical channel 503. The ATM switch 507 routes the input cells, VCI and VPI, based on the individual header 302, to a physical channel 504, a physical channel 505, and a physical channel 506.

The CAM 100 compares the VPI and VCI in the header 302 with the VPI and VCI entries in the CAM 100. A VPC exists if a match occurs for the VPI and a special VCI value in the CAM 100 identifying a VPC. The match data tells the ATM switch 507 where to route the data and how to translate all or a portion of the data in the header 302.

In one example, the physical channel 501 contains a VPI value of 5 with a VCI value of 1, a VCI value of 2, and a VCI value of 3. The CAM 100 searches the match word table 102 and a match occurs for the VPI and VCI values above with a special VCI value identifying a VPC. The link word associated with the match word contains a translate value for the VPI of 7. The ATM switch 507 routes physical channel 501 to the physical channel 504 and translates the VPI value from 5 to 7; however, the VCI retain the values of 1, 2, and 3. Therefore, for a VPC, the VPI value is translated but the VCI value remains the same.

In another example, the physical channel 502 contains a VPI value of 1 with a VCI value of 1, a VCI value of 2, and a VCI value of 3, in the header 302. The CAM 100 searches the match word table 102 and a match occurs for both the VPI and VCI values, resulting in a VCC. The link word associated with the match word contains a translate value for VPI of 5 and a translate value for VCI of 12, 13, and 14, for the VCI values of 1, 2, and 3, respectively. The ATM switch 507 routes the physical channel 502 to the physical channel 506 and translates the VPI value from 1 to 5, and translates the VCI values from 1, 2 and 3 to 12, 13, and 14 respectively. Therefore, for the VCC, both the VPI value and the VCI value are translated.

Figure 6:
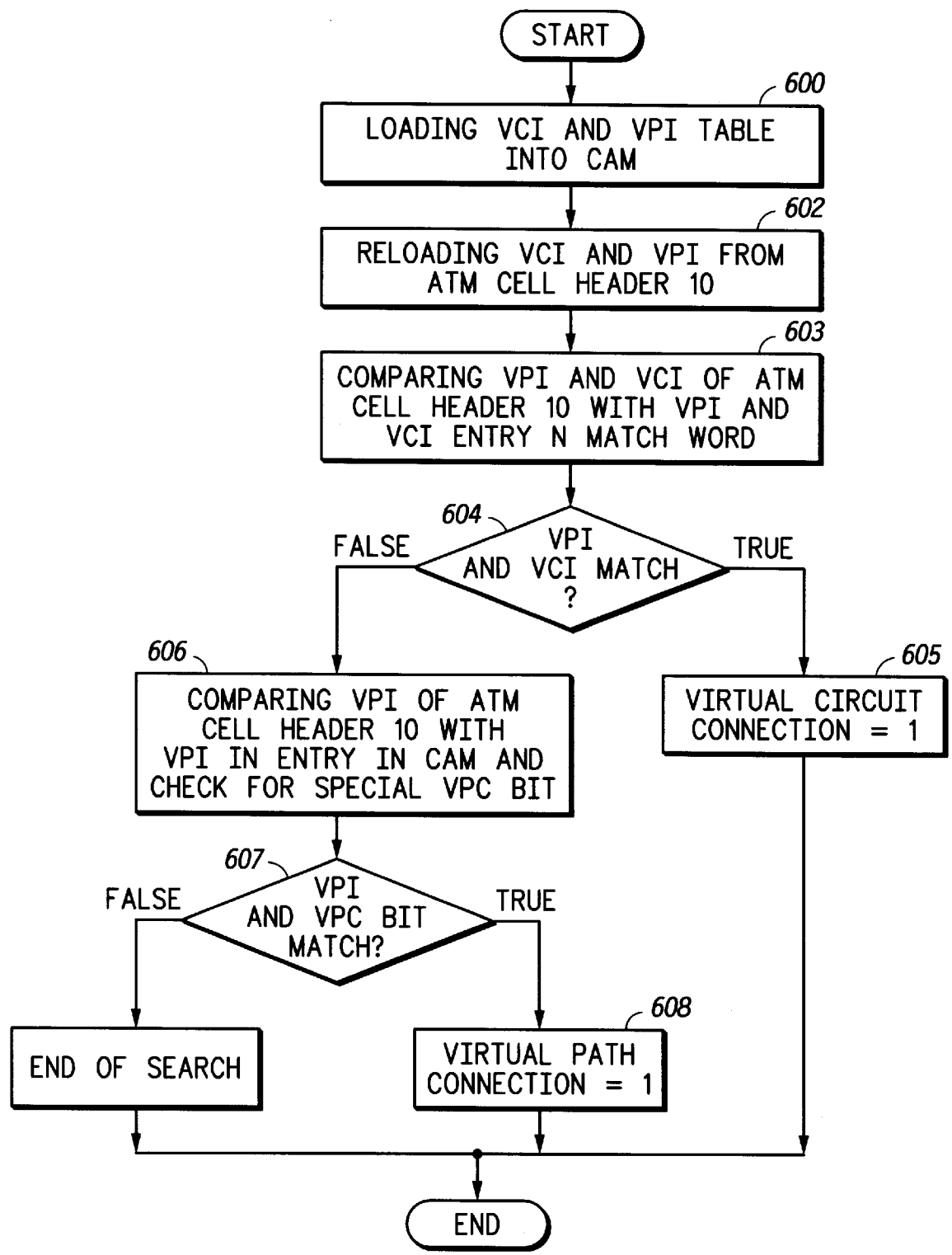
FIG. 6 depicts, in flow chart form, a known method of an ATM cell header search.

FIG. 6 depicts, in flow chart form, a known method of the header 302 search. A predetermined set of VPI and VCI values are loaded into the CAM 100 to route the data in the header 302, a step 601. The first search begins by reading the VCI and VPI values from the header 302, a step 602. The first search is for a VCC by comparing the VPI and VCI values in the header 302 with the VPI and VCI values in the match word table 102, a step 603. A decision is made whether the VPI and VCI values match, a step 604. If the decision is true (a match), the VCC is valid, a step 605. The VPI and VCI values are translated to the values defined in the associated link word. However, if the decision is false (no match), compare the VPI value in the header 302 with the VPI value in the match word table 102 and check for a special VPC bit in the match table 102, a step 606. A decision is made whether the VPI values match and if the special VPC bit exists in the match word table 102, a step 607. If the decision is true, the VPC is valid, a step 608. The VPI value is translated to the value defined in the associated link word. However, if the decision is false (no match), then the search ends without a match. One skilled in the art will readily appreciate that this known algorithm requires two separate CAM look-ups: one CAM is used twice or two CAMs are used once each. In either case, time or silicon is used excessively.

Figure 7:
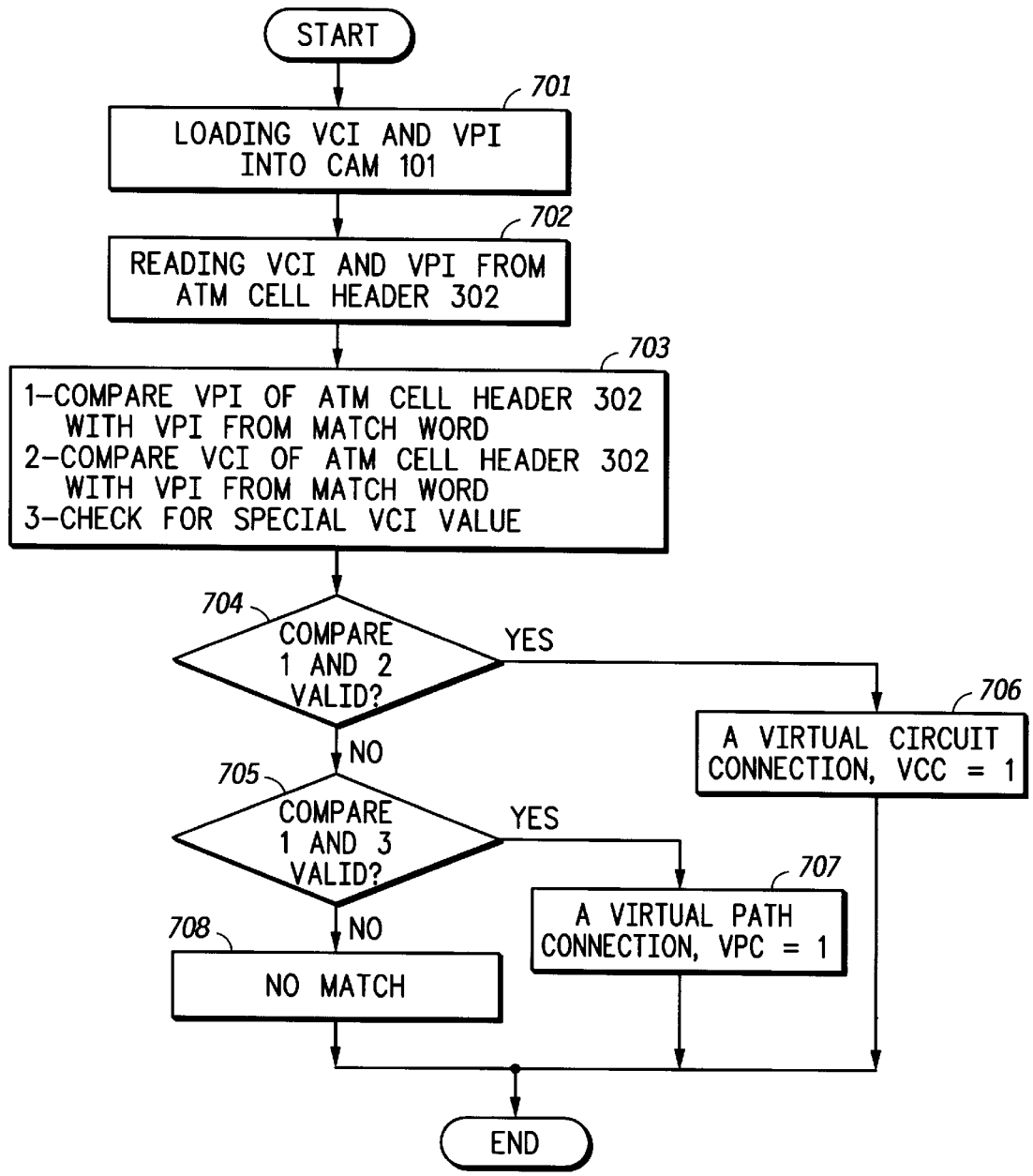
FIG. 7 depicts, in flow chart form, an ATM cell header search in accordance with the present invention.

FIG. 7 depicts, in flow chart form, a header 302 search in accordance with the present invention. A predetermined set of VPI and VCI values are loaded into the CAM 100 to route the data in the header 302, a step 701. In the depicted embodiment, the VCI and VPI values are sorted and stored in increasing number, as described above in FIG. 1. However, both aspects of the disclosed invention may be practiced independent of each other or can be combined. Both searches begin with reading the VCI and VPI values from the header 302, a step 702. A step 703 consists of three comparisons: the first comparison consists of comparing the VPI from the header 302 with the VPI from the match word table 102, the second comparison consists of comparing the VCI from the header 302 with the VCI from the match word table 102, the third comparison consists of comparing the VCI from the match word table 102 for a special VCI value of logic ones. The following steps, 704 and 705, are performed simultaneously, though depicted as occurring serially. A decision is made whether the first comparison (VPI from header 302 is equal to VPI from match word) and the second comparison (VCI from header 302 is equal to VCI from match word) are true (a match), a step 704. If the decision is true(a match), the VCC is valid in step 706 and the VPI and VCI values are translated to the values in the associated link word. However, if the decision is false, then the VCC search ends without a match. The VPC search compares the VPI value of the header 302 with the VPI value of the match word table 102 entry in the CAM 100 and checks for the special VCI value in the match word table 102 entry. A decision is made whether the VPI values match and the special VCI value exists in the match word table 102 entry, a step 705. If the decision is true (a match), the VPC is valid in step 707 and the VPI value is translated to the value in the associated link word. However, if the decision is false, then the VPC search ends without a match. If the VPC is valid, the VPCVALID signal asserts a logic pin.

The special VCI value identifying a VPC is set in the initial loading of the match word table 102 and is arbitrary. In this embodiment, the special VCI value contains sixteen logic ones, "1".

Asserting the logic pin for a valid VPC with the VPCVALID signal, simplifies testing and simplifies operation by the end user. The logic pin simplifies testing of the CAM 100 by identifying the state of the device. A need exists to determine if a VPC or VCC is valid to properly test the device. Another benefit is the end user recognizes if the VPC is valid by a logic high on the pin. End users, such as system designers, utilize the logic pin to enable or disable other system functions based on a valid VPC. For example, if a system designer needs to route to another ATM switch based on a valid VPC, the logic pin is used as a gate signal for the control circuitry. The logic pin simplifies system design and increases flexibility.

Figure 8:
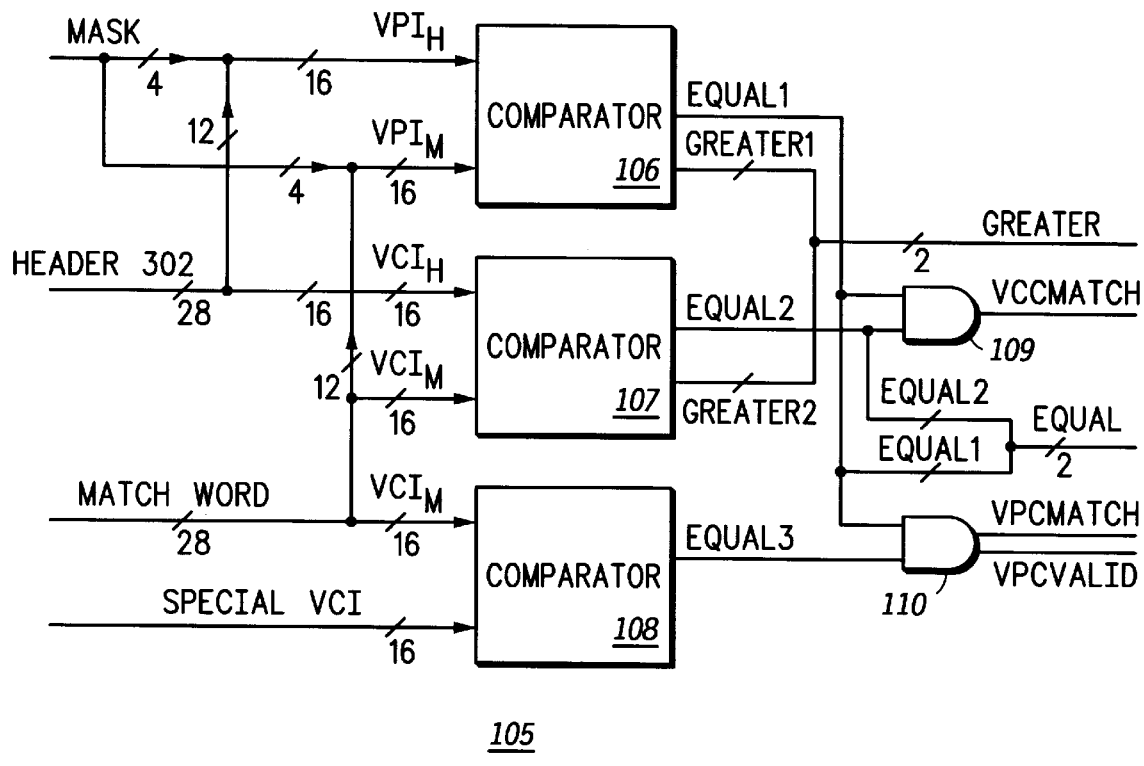
FIG. 8 depicts a block diagram of a comparator in accordance with the present invention.

FIG. 8 depicts a block diagram of the comparator 105. The comparator 105 is comprised of three compare elements, comparator 106, comparator 107, and comparator 108 and an AND gate 109 and an AND gate 110. The comparator 105 receives the reference word at terminal 121 and the match word at terminal 122. In this embodiment, the reference word is the header 302. Comparator 106 receives at one input a 16 bit VPI, 12 bits from the header 302 (byte 1 and bits 5:8 of byte 2) and 4 bits. Four bits are added as most significant bits with the mask, and are user defined. Adding the four bits is discussed below in FIG. 10. Four bits are added so each compare element may be implemented with the same 16 bit comparator design. Comparator 106 receives at another input, a 16 bit VPI, 12 bits from the match word and 4 bits. Four bits are added as most significant bits with the mask, and are user defined. Comparator 107 receives at one input a 16 bit VCI from the header 302. Comparator 107 receives at another input a 16 bit VCI from the match word. Comparator 108 receives at one input a 16 bit VCI from the match word. Comparator 108 receives at another input a special 16 bit VCI value.

$VPI_H$ designates the VPI from the header 302, $VPI_M$ designates the VPI from the match word, $VCI_H$ designates the VCI from the header 302, $VCI_M$ designates the VCI from the match word. Each compare element determines if the two 16 bit inputs are equal on a bit by bit comparison. An output of comparator 106 generates a EQUAL1 signal if the two VPI inputs are equal. An output of comparator 107 generates a EQUAL2 signal if the two VCI inputs are equal. An output of comparator 108 generates a EQUAL3 signal if the two VCI inputs are equal.

The AND gate 109 receives at one input the EQUAL1 signal and receives at another input the EQUAL2 signal. The AND gate 110 receives at one input the EQUAL1 signal and receives at another input the EQUAL3 signal. An output of the AND gate 109 generates the VCCMATCH signal. An output of the AND gate 110 generates the VPCMATCH signal and the VPCVALID signal.

The compare elements, comparator 106, comparator 107 and comparator 108, determine if a VPC or VCC exists. By comparing the VPI and VCI information from the header 302 and the match word from the match word table 102, each compare element determines if the inputs are equal. EQUAL1 signal is a logic one if the VPI from the header 302 and the match word are identical on a bit by bit basis. EQUAL2 is a logic one if the VCI from the header 302 and the match word are identical on a bit by bit basis. EQUAL3 is a logic one if the VCI from the match word and the special VCI are identical on a bit by bit basis. The output of the AND gate 109, the VCCMATCH signal, is a logic one if the VCC exists. The outputs of the AND gate 110, the VPCMATCH signal and the VPCVALID signal, are a logic one if the VPC exists. Comparator 108 generates EQUAL3 faster than comparator 106 and comparator 107 generate EQUAL1 and EQUAL2, respectively. The EQUAL signal contains 2 bits, one bit representing EQUAL1 and one bit representing EQUAL2. Generating the EQUAL1 and EQUAL2 signals are discussed in further detail in FIG. 10. The special VCI value contains sixteen logic ones, therefore, the comparator 108 checks the VCI from the match word for logic ones. Comparator 106 and comparator 107 need to compare both inputs for logic ones and logic zeroes, comparator 108 only checks the VCI from the match word for logic ones, therefore, performing the comparison faster than comparator 106 and comparator 107.

Figure 9:
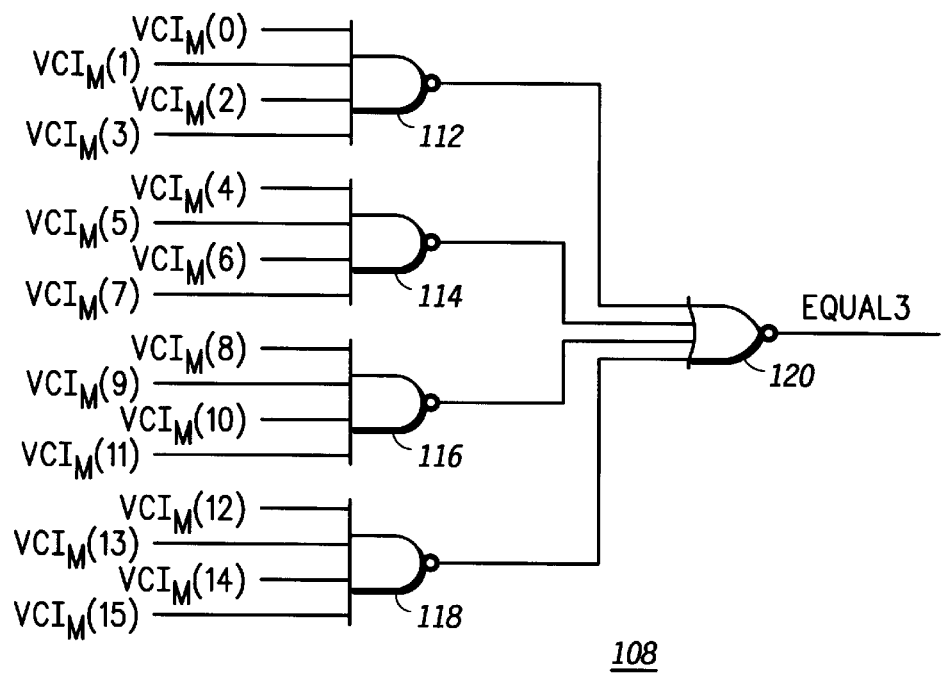
FIG. 9 depicts a circuit schematic of a comparator illustrated in FIG. 8.

FIG. 9 depicts a circuit schematic of comparator 108. Comparator 108 receives the 16 bit VCI from the match word and performs a bit by bit comparison with the special VCI value. In this embodiment, the special VCI value contains all logic ones, "1". Therefore, comparator 108 checks the 16 bit VCI from the match word for logic ones. A NAND gate 112 receives four bits from the VCI of the match word, bits 0, 1, 2, and 3. A NAND gate 114 receives four bits from the VCI of the match word, bits 4, 5, 6, and 7. A NAND gate 116 receives four bits from the VCI of the match word, bits 8, 9, 10, and 11. A NAND gate 118 receives four bits from the VCI of the match word, bits 12, 13, 14, and 15. A NOR gate 120 receives an output of the NAND gate 112, an output of the NAND gate 114, an output of the NAND gate 116, and an output of the NAND gate 118. An output of the NOR gate 120 generates the EQUAL3 signal.

The operation of comparator 108 is based on minimizing the logic by using logic ones for the special VCI value. By simplifying the comparison, comparator 108 checks the VCI from the match word for logic ones. The EQUAL3 signal is a logic one if the VCI from the match word consists of logic ones. In other embodiments, comparator 108 may test for different bit patterns or may be programmable. In such a case, comparator 108 may be implemented as are comparator 106 and comparator 107, described below in FIG. 10.

Figure 10:
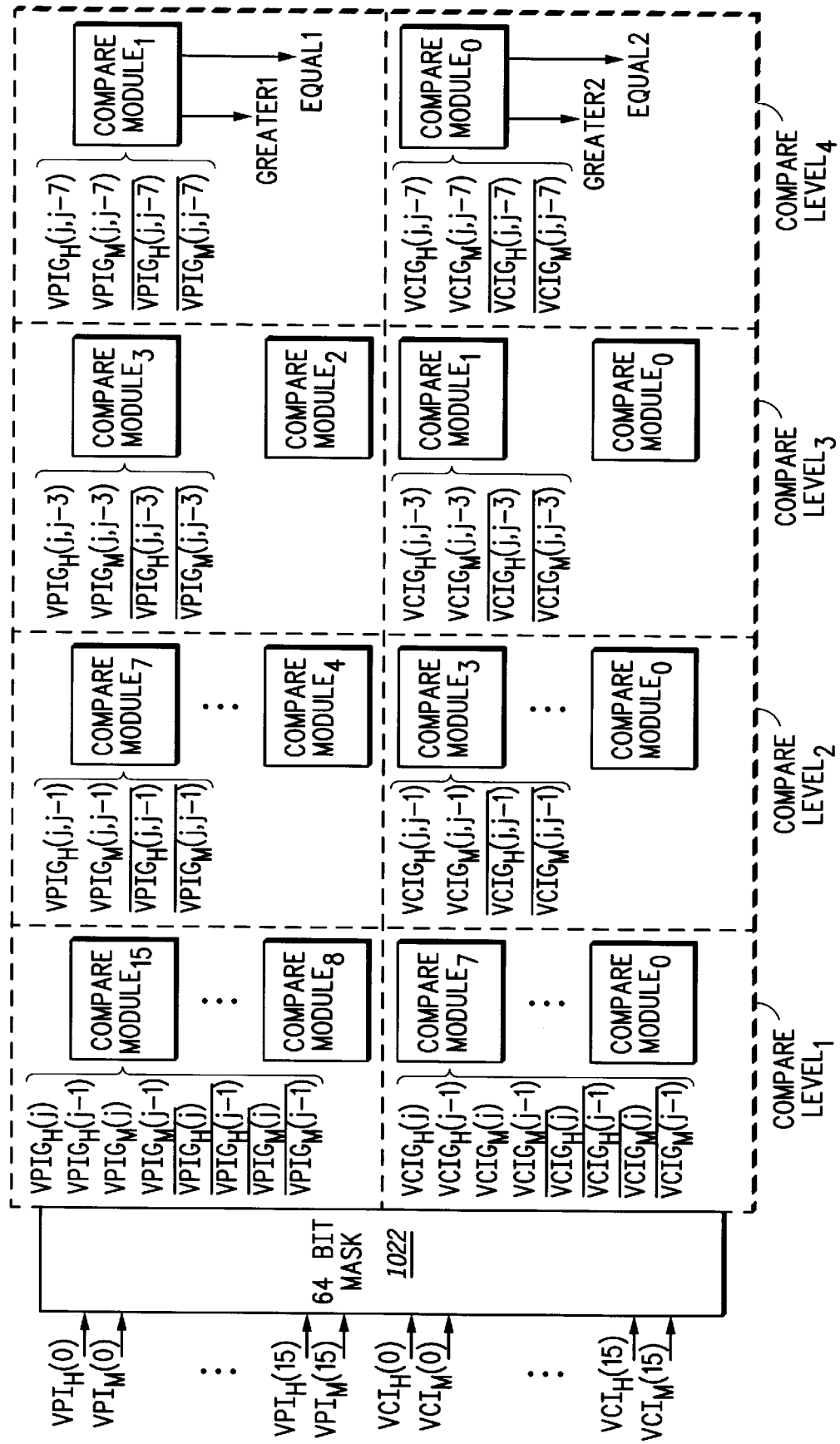
FIG. 10 depicts a detailed block diagram of the comparator illustrated in FIG. 8.

FIG. 10 depicts a detailed block diagram of comparator 106 and comparator 107. The block diagram consists of a maskable XOR block 1022 and a series of comparelevel blocks each with one or more comparemodules$_{a,b}$ where a and b are integer indexes, a ranging from 1 to 4, and b ranging from 0 to 15. Comparelevel$_1$ consists of 16 comparemodules$_{1,j}$ where j is an integer index ranging from 0 to 15. Comparelevel$_2$ consists of 8 comparemodules$_{2,k}$ where k is an integer index ranging from 0 to 7. Comparelevel$_3$ consists of 4 comparemodules$_{3,m}$ where m is an integer index ranging from 0 to 3. Comparelevel$_4$ consists of 2 comparemodules$_{4,n}$ where n is an integer index ranging from 0 to 1. The maskable XOR block 1022 receives the 16 bit VPI from the header 302, the 16 bit VPI from the match word, the 16 bit VCI from the header 302, and the 16 bit VCI from the match word, and a mask bus. The maskable XOR block 1022 compares all the bits of $VPI_H$ with all the bits of $VPI_M$, two bits at a time. Also, the maskable XOR block 1022 compares all the bits of $VCI_H$ with all the bits of $VCI_M$, two bits at a time. The maskable XOR block compares the two most significant bits of $VPI_H$ and $VPI_M$ and outputs the results to comparemodule$_{1,15}$. The maskable XOR block compares the next two most significant bits of $VPI_H$ and $VPI_M$ and outputs the results to comparemodule$_{1,14}$. Comparemodule$_{1,8}$ receives the comparison results of the two least significant bits of $VPI_H$ and $VPI_M$. In a similar method, the maskable XOR block compares the two most significant bits of $VCI_H$ and $VCI_M$ and outputs the results to comparemodule$_{1,7}$. Comparemodule$_{1,0}$ receives the comparison results of the two least significant bits of $VCI_H$ and $VCI_M$. Eight signals are generated by the maskable XOR block 1022 to represent the results of the four bits that were compared on a bit by bit basis and the complement of the results and are provided to the comparemodules in comparelevel$_1$.

Comparemodules$_{1,j}$ (for $8 \leq j \leq 15$) in comparelevel$_1$ receive eight inputs, $VPIG_H(j)$, $VPIG_H(j-1)$, $VPIG_M(j)$, $VPIG_M(j-1)$ and the complements of the four preceding signals from the maskable XOR block 1022. Comparemodules$_{1,j}$ (for $0 \leq j \leq 7$) in comparelevel1 receive eight inputs, $VCIG_H(j)$, $VCIG_H(j-1)$, $VCIG_M(j)$, $VCIG_M(j-1)$ and the complements of the four preceding signals from the maskable XOR block 1022. Each signal represents the comparison of the corresponding j or j-1 bit between $VPI_H$ and $VPI_M$, and $VCI_H$ and $VCI_M$. $VPIG_H(j)$ represents if the jth bit of $VPI_H$ is greater than the jth bit of $VPI_M$.

Each comparemodule in comparelevel$_1$ generates four outputs. Comparemodules$_{1,j}$ (for $8 \leq j \leq 15$) generate $VPIG_H$(j, j-1), $VPIG_M$(j, j-1), and the complement of each of the preceding two signals and provides them as inputs to the comparemodules in comparelevel$_2$. Comparemodules$_{1,j}$ (for $0 \leq j \leq 7$) generate $VCIG_H$(j, j-1), $VCI_M$(j, j-1), and the complement of each of the preceding two signals and provides them as inputs to the comparemodules in comparelevel$_2$.

Each comparemodule in comparelevel$_2$ receives eight outputs from two of the comparemodules$_{1,j}$ in comparelevel$_1$. Each comparemodule in comparelevel$_2$ generates four outputs. Comparemodules$_{2,k}$ (for $4 \leq k \leq 7$) generate $VPIG_H$(j, j-3), $VPIG_M$(j, j-3), and the complement of each of the preceding two signals and provides them as inputs to the comparemodules in comparelevel$_3$. Comparemodules$_{2,k}$ (for $0 \leq k \leq 3$) generate VCIG$_H$(j, j−3), VCI$_M$(j, j−3), and the complement of each of the preceding two signals and provides them as inputs to the comparemodules in comparelevel$_3$.

Comparemodules$_{3,m}$ (for $2 \leq m \leq 3$) generate VPIG$_H$(j, j−7), VPIG$_M$(j, j−7), and the complement of each of the preceding two signals and provides them as inputs to the comparemodules in comparelevel$_4$. Comparemodules$_{3,m}$ (for $0 \leq m \leq 1$) generate VCIG$_H$(j, j−7), VCI$_M$(j, j−7), and the complement of each of the preceding two signals and provides them as inputs to the comparemodules in comparelevel$_4$. Comparemodule$_{4,1}$ receives VPIG$_H$(j, j−7), VPIG$_M$(j, j−7), and the complement of each of the preceding two signals. Comparemodule$_{4,1}$ generates a Greater1 and an Equal1 signal. Comparemodule$_{4,0}$ receives VCIG$_H$(j, j−7), VCI$_M$(j, j−7), and the complement of each of the preceding two signals. Comparemodule$_{4,0}$ generates a Greater2 and an Equal2 signal.

The comparator in FIG. 10 performs the function of comparator 106 and comparator 107. The comparator in FIG. 10 utilizes a modular approach with a parallel comparison of inputs, VPI$_H$, VPI$_M$, VCI$_H$, and VCI$_M$. Advantages of the modular approach include a parallel comparison with matching loads. The matching loads provide a stable, consistent design which performs a parallel comparison. Another advantage is the 64 bit maskable XOR allows the user the flexibility of ignoring or "masking" out any of the 64 bits. In this embodiment, every bit is compared, none of the bits are masked out.

Figure 11:
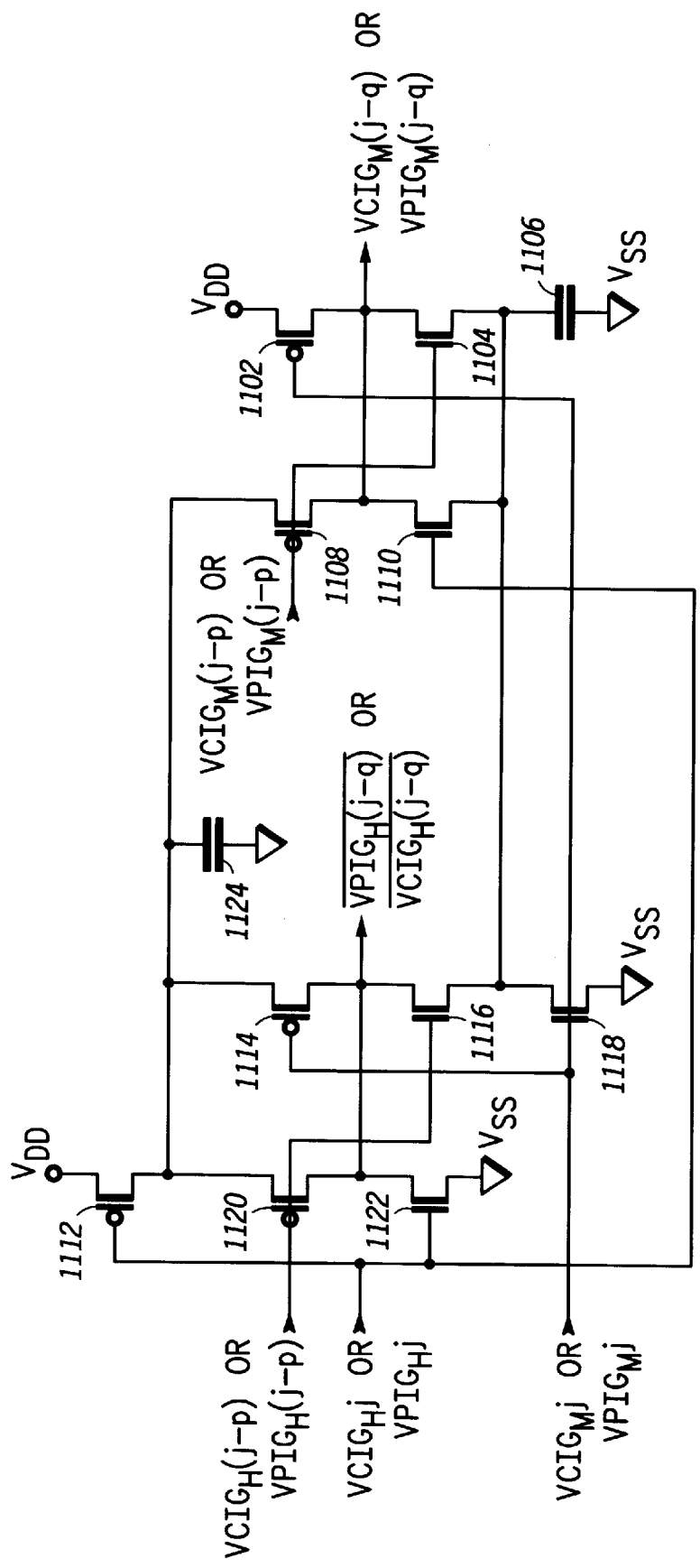
FIG. 11 depicts a circuit schematic of a two bit comparator illustrated in FIG. 10.

FIG. 11 depicts a circuit schematic of the comparemodules illustrated in FIG. 10. The circuit schematic represents any comparemodule in FIG. 10. The comparemodules are used for comparing VPI or VCI, therefore the circuit schematic will identify signals for both VPI or VCI. Inputs to the circuit schematics are depicted with a (j−p) bit, where p is an integer representing either 0, 1, 3 or 7. Recall from FIG. 10, the inputs to the comparemodules in comparelevel$_1$ and comparelevel$_2$ are (j−1), inputs to the comparemodules in comparelevel$_3$ are (j−3), and inputs to the comparemodules in comparelevel$_4$ are (j−7). Therefore (j−p) represents any input to the comparemodules in any comparelevel. In a similar method, the output of the circuit schematics are (j−q), wherein q is an integer 1, 3, 7 and q is greater than p at all times. In the comparemodules in comparelevel4, the outputs are Greater1, Greater2, Equal1, and Equal2.

An output, VCIG$_M$(j−q) and VPIG$_M$(j−q) is coupled to a drain of a p-type transistor 1102 and to a source of a n-type transistor 1104, and is coupled to a drain of a p-type transistor 1108 and to a source of a n-type transistor 1110. The source of transistor 1102 is coupled to a power supply, Vdd. The source of transistor 1108 is coupled to one terminal of a capacitor 1124, to a source of p-type transistor 1114 and a source of p-type transistor 1120, and to a drain of transistor 1112. A source of transistor 1112 is coupled to a power supply, Vdd. Another terminal of the capacitor 1124 is coupled to ground, Vss. The drains of transistor 1104 is coupled to one terminal of a capacitor 1106, a drain of transistor 1110 and a drain of a n-type transistor 1116, and to a source of a n-type transistor 1118. Another terminal of capacitor 1106 is coupled to ground, Vss. A drain of transistor 1118 is coupled to ground, Vss. A gate of transistor 1104 and a gate of transistor 1108 are coupled to an input of VCIG$_M$(j) or VPIG$_M$(j). A gate of transistor 1102 is coupled to a gate of transistor 1114 and to an input of the complement of VCIG$_M$(j−p) or VPIG$_M$(j−p). A gate of transistor 1110 is coupled to a gate of n-type transistor 1122, a gate of transistor 1112, and an input of VCIG$_M$(j) or VPIG$_M$(j). A gate of p-type transistor 1120 is coupled to a gate of n-type transistor 1116 and to an input, VCIG$_M$(j−p) or VPIG$_M$(j−p). An output, the complement of VCIG$_M$(j−q) or VPIG$_M$(j−q), is coupled to a drain of a transistor 1120 and to a source of a transistor 1116, and is coupled to a drain of a transistor 1114 and to a source of a transistor 1122. The drain of transistor 1122 is coupled to ground, Vss.

By now it should be appreciated that a circuit and a method for implementing a content addressable memory circuit and a concurrent search for switching identifiers has been provided. The content addressable memory circuit can be implemented with existing semiconductor process technology and is readily integrated on a semiconductor die. The concurrent search for switching identifiers uses only one CAM and determines a VPC or VCC utilizing a concurrent search.

Although the present invention has been described with reference to a specific embodiment, further modifications and improvements will occur to those skilled in the art. For instance, as the amount of identifier information in the atm cell header 302 increases, more parallel searches are needed. For example, with larger bandwidths for more complex networks in the future, more switching identifiers require a parallel search. Therefore, the present invention is expanded to include more parallel searches. It is to be understood therefore, that the invention encompasses all such modifications that do not depart from the spirit and scope of the invention as defined in the appended claims.

We claim:

1. A method for implementing a content addressable memory (CAM), comprising the steps of:
   providing a first memory array and a second memory array
   wherein said first memory array comprises match words
   and said second memory array comprises link words;
   providing a reference word to the CAM;
   binarily searching said first memory array to find a match word equal to said reference word, wherein the step of binarily searching further comprises;
   while the contents of a selected location is not equivalent to the reference word, performing a loop comprising the steps of;
   accessing a location in the first memory array, the selected location, the location dividing the first memory array into a first portion and a second portion;
   comparing the contents of the selected location to the reference word;
   selecting the first portion or the second portion as a subset of the first memory array to search in a subsequent loop iteration; and
   outputting a link word from said second memory array corresponding to said match word.

2. The method of claim 1, further comprising a step of sorting the first memory array in a numerical order such that a numerically lower match word corresponds to a numerically lower location address.

3. The method of claim 1 wherein the step of selecting comprises a step of determining whether the contents of the location is numerically greater than the reference word.

4. A method for a concurrent search of control information comprising the steps of:
   reading a first and second field from a header; and
   comparing in parallel:

1) the first field and a first tag;
2) the second field and a second tag; and
3) the second field with a predetermined vector, the predetermined vector being equal in length to the second field.

5. The method of claim 4 wherein the step of reading further comprises the step of binarily indexing a memory array, wherein the step of binarily indexing comprises;

while a match condition is not satisfied, performing a loop comprising the steps of;

accessing a header from a memory array, hereafter a "selected location," the location dividing the memory array into a first portion and a second portion;

executing steps 1) through 3) to generate the match condition; and selecting the first portion or the second portion as a subset of the memory array to search in a subsequent loop iteration.

6. The method of claim 4 wherein the first field and the second field comprise an ATM header.

7. The method of claim 4 further comprising the steps of: translating the first field and the second field responsive to the step of comparing.

8. The method of claim 7 wherein the step of translating comprises:

providing an output signal if:
1) the first field and first tag are equal and
2) the second field and second tag are equal and translating the second field if:
1) the first field and first tag are equal and
2) the second field and the predetermined vector are equal.

9. An apparatus for concurrent search of control information comprising a first and second field of a data packet comprising:

a first comparator for comparing the first field and a first field of a translation vector of the data packet;

a second comparator for comparing the second field and a second field of the translation vector; and a third comparator for comparing the second field and a predetermined bit pattern, the predetermined bit pattern being equal in length to the second field.

10. The apparatus of claim 9 further comprising:

a first gating means for logically combining an output signal of the first comparator and the second comparator; and a second gating means for logically combining an output signal of the first comparator and the third comparator.

11. The apparatus of claim 9 wherein the data packet is an ATM header.

12. The method of claim 8 wherein the step of reading further comprises the step of binarily indexing a memory array, wherein the step of binarily indexing comprises;

while a match condition is not satisfied, performing a loop comprising the steps of;

accessing a header from a memory array, hereafter a "selected location," the location dividing the memory array into a first portion and a second portion;

executing steps 1) through 3) to generate the match condition; and selecting the first portion or the second portion as a subset of the memory array to search in a subsequent loop iteration.

\* \* \* \* \*